United States Patent
Emelyanov et al.

(10) Patent No.: US 10,452,408 B1
(45) Date of Patent: Oct. 22, 2019

(54) SYSTEM AND METHOD FOR INTERCEPTING DATA FLOW BETWEEN A COMPUTER PROCESS AND A FILE

(71) Applicant: VIRTUOZZO INTERNATIONAL GMBH, Schaffhausen (CH)

(72) Inventors: Pavel Emelyanov, Moscow (RU); Alexey Kobets, Seattle, WA (US)

(73) Assignee: VIRTUOZZO INTERNATIONAL GMBH, Schaffhausen (CH)

( * ) Notice: Subject to any disclaimer, the term of this patent is extended or adjusted under 35 U.S.C. 154(b) by 171 days.

(21) Appl. No.: 15/393,879

(22) Filed: Dec. 29, 2016

(51) Int. Cl.
 *G06F 9/445* (2018.01)
 *G06F 9/54* (2006.01)
 *G06F 9/50* (2006.01)
 *G06F 13/24* (2006.01)

(52) U.S. Cl.
 CPC ............ *G06F 9/44526* (2013.01); *G06F 9/50* (2013.01); *G06F 9/54* (2013.01); *G06F 9/544* (2013.01); *G06F 13/24* (2013.01); *G06F 2209/542* (2013.01)

(58) Field of Classification Search
 None
 See application file for complete search history.

(56) References Cited

U.S. PATENT DOCUMENTS

| | | | | |
|---|---|---|---|---|
| 5,884,033 | A * | 3/1999 | Duvall | H04L 29/06 709/206 |
| 10,089,461 | B1 * | 10/2018 | Ha | G06F 21/56 |
| 2004/0221294 | A1 * | 11/2004 | Kalmuk | G06F 9/544 719/312 |
| 2005/0240906 | A1 * | 10/2005 | Kinderknecht | G06F 9/44521 717/136 |
| 2006/0156397 | A1 * | 7/2006 | Dai | G06F 21/554 726/22 |
| 2012/0233612 | A1 * | 9/2012 | Beckett | G06F 9/45533 718/1 |

* cited by examiner

*Primary Examiner* — Umut Onat
(74) *Attorney, Agent, or Firm* — Arent Fox LLP; Michael Fainberg

(57) ABSTRACT

A system and method is provided for intercepting and processing input/output of computer processes without requiring the restarting and/or recompiling of the connected processes. An exemplary method includes interrupting an execution of a first process by a CPU of a computing device having an operating system with a first file descriptor table that references the first process to a system resource and loading parasite code into an address space of the first process. The method further includes creating a communication channel between the first and second processes, updating a second file descriptor table for the second process so that the second file descriptor table includes an index references to the system resource and the communication channel, and updating the index reference in the first file descriptor table to reference the communication channel. Once the file descriptor tables have been updated the execution of the first process is restored.

22 Claims, 10 Drawing Sheets

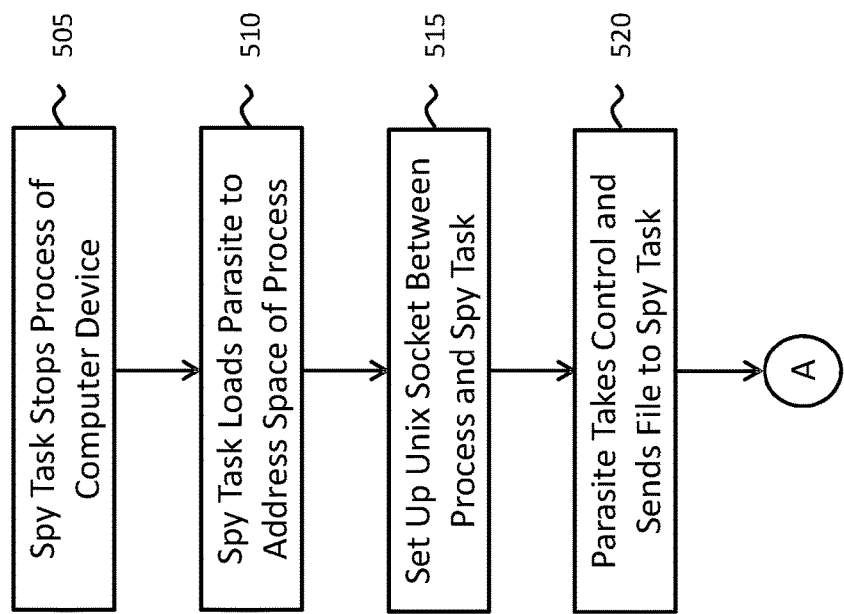

SYSTEM AND METHOD FOR INTERCEPTING DATA FLOW BETWEEN A COMPUTER PROCESS AND A FILE

TECHNICAL FIELD

The present disclosure generally relates to the field of computer processing, and, more particularly, to a system and method for controlling and intercepting data traffic between a computer process and a file.

BACKGROUND

Typically, when a computer program is written and compiled, there is no way to add functionality to the program without having to recompile the code. However, there are some techniques that enable a piece of software code to be added to the process of the executing program. For example, COMPEL is a software utility provided to execute arbitrary code in a context of a foreign process. COMPEL is part of CRIU ("Checkpoint/Restore In Userspace"), which is a software tool for the LINUX operating system provided to implement checkpoint/restore functionality for LINUX. Using COMPEL, a user creates a parasite code, compiles the code, and links the code using the COMPEL utility. Once compiled with COMPEL flags and linked, the parasite code can be executed in another process's context with the help of COMPEL library.

FIG. 1 illustrates a high-level flow diagram for execution and working with files of a conventional computer process. As shown, a process or task 10 that is executed by a computer processing unit of a computer access a file descriptor table 11 of the operating system of the computer to read data from and write data to a File "X", denoted by reference 12. When the task 10 is to perform a read or write operation to the File X, the task 10 uses a system call and the descriptor (e.g., descriptor number 4), which provides a reference or indicator to the File X, is used as an argument. In other words, for any I/O system call that operates on a file such as File X, the first argument for the system call is a file descriptor. Thus, in this instance, the process makes a system call for the 4th file descriptor in the file descriptor table 11 to write and read data to and from File X.

In this context, the COMPEL utility is able to add parasite code to the task 10 that can be executed in that process's context so that when it is executing its own code, the task 10 interrupts, executes the loaded code (i.e., the parasite code), and then continues to run the original compiled program code. COMPEL works by connecting to the process 10 using a debugging program interface of the operating system and stopping the process 10 as if it is interrupted at the breakpoint. For example, in LINUX, there is a debugging program interface that allows another process to connect to the process 10, and to read from and write to the memory of the process 10. In the process address space, COMPEL identifies a white space and writes the binary code (i.e., the parasite code) so that it is loaded into the process. Accordingly, using the debugging program interface, COMPEL changes the registers of the process 10 containing the next instruction (i.e., the "RIP") to the entry point of the loaded binary code. Then, it gives the command to proceed execution of the process.

With the COMPEL utility, the binary code (i.e., the parasite code) is compiled in a way that when its execution comes to an end, it signals its stop point to the debugging programming interface. COMPEL intercepts that signal, unloads the binary code, and changes the process registers to the values that they had at the breakpoint, such that the process 10 proceeds to full execution. As a result, COMPEL facilitates the execution of a code fragment with the execution of process 10 without appearing to do so.

Although applications like the COMPEL utility enable code to be added to a compiled process (e.g., task 10), there is currently no ability to modify existing processes that perform operations for system resources after being compiled. For example, while the COMPEL utility can add code, it cannot modify an existing read and/or write operation from task 10 to File X. In other words, existing systems cannot access or modify the communication channel between task 10 and File X via file descriptor table 11. Accordingly, a more flexible approach is needed for easily modifying a complied computer program.

SUMMARY

Thus, the present disclosure provides for a system and method for controlling and intercepting input/output between a computer process and a file or other system resource without requiring the restarting and/or recompiling of the connected processes. In one aspect, an exemplary method includes interrupting an execution of a first process by a CPU of a computing device having an operating system with a first file descriptor table associated with the first process, the first file descriptor table including an index reference for the first process to a system resource; loading parasite code into an address space of the first process; providing a communication channel between the first process and a second process; updating a second file descriptor table for the second process so that the second file descriptor table includes a first index reference to the system resource and a second index reference to the communication channel; updating the index reference in the first file descriptor table to reference the communication channel; and restarting the execution of the first process by the CPU of the computing device.

In another aspect, the method further includes transferring, by the parasite code, the system resource to the second process using the communication channel.

In another aspect, the method further includes providing the communication channel as a socket to transfer the system resource to the second process; creating a pipe between the first process and a second process to be used during execution of the first process; updating the index reference in the first file descriptor table to reference the pipe; and removing the socket after creating the pipe and transferring the system resource to the second process.

In another aspect, upon the restoring of the execution of the first process, the method further includes performing a data processing action, by the second process, on data communicated between the first process and the system resource.

In another aspect, the performing of the data processing action comprises at least one of encrypting and decrypting the data, packing and unpacking the data, and multiplexing the data.

In another aspect, the system resource is one of a disk file, a pipe, a device, a socket, and a terminal device.

In another aspect, the performing of the data processing action includes identifying at least one keyword associated with at least a portion of the data communicated between the first process and the system resource, and performing the data processing action on the portion of the data associated with the at least one keyword.

In another aspect, the interrupting of the execution of the first process comprises interrupting the execution of the first process using a COMPEL library.

In one further aspect a system is provided for controlling and intercepting input/output between a computer process and a file or other system resource. In this aspect, the system includes electronic memory; and a processor configured to interrupt an execution of a first process by a CPU of a computing device having an operating system with a first file descriptor table associated with the first process, the first file descriptor table including an index reference for the first process to a system resource, load parasite code into an address space of the first process, establish a communication channel between the first process and a second process, access from the electronic memory and update a second file descriptor table for the second process so that the second file descriptor table includes a first index reference to the system resource and a second index reference to the communication channel, update the index reference in the first file descriptor table to reference the communication channel, and cause the restoring of the execution of the first process by the CPU of the computing device.

In another aspect, a non-transitory computer readable medium is provided that includes computer executable instructions for controlling and intercepting input/output between a computer process and a file or other system resource. In this aspect, instructions are provided for interrupting an execution of a first process by a CPU of a computing device having an operating system with a first file descriptor table associated with the first process, the first file descriptor table including an index reference for the first process to a system resource; loading parasite code into an address space of the first process; providing a communication channel between the first process and a second process; updating a second file descriptor table for the second process so that the second file descriptor table includes a first index reference to the system resource and a second index reference to the communication channel; updating the index reference in the first file descriptor table to reference the communication channel; and restoring the execution of the first process by the CPU of the computing device.

The above simplified summary of example aspects serves to provide a basic understanding of the invention. This summary is not an extensive overview of all contemplated aspects, and is intended to neither identify key or critical elements of all aspects nor delineate the scope of any or all aspects of the invention. Its sole purpose is to present one or more aspects in a simplified form as a prelude to the more detailed description of the invention that follows. To the accomplishment of the foregoing, the one or more aspects of the invention include the features described and particularly pointed out in the claims.

BRIEF DESCRIPTION OF THE DRAWINGS

The accompanying drawings, which are incorporated into and constitute a part of this specification, illustrate one or more example aspects of the invention and, together with the detailed description, serve to explain their principles and implementations.

FIGS. 5A-5B illustrates a flowchart for a method for intercepting and controlling data traffic between a computer process and a file according to an exemplary aspect.

DETAILED DESCRIPTION

Figure 1:
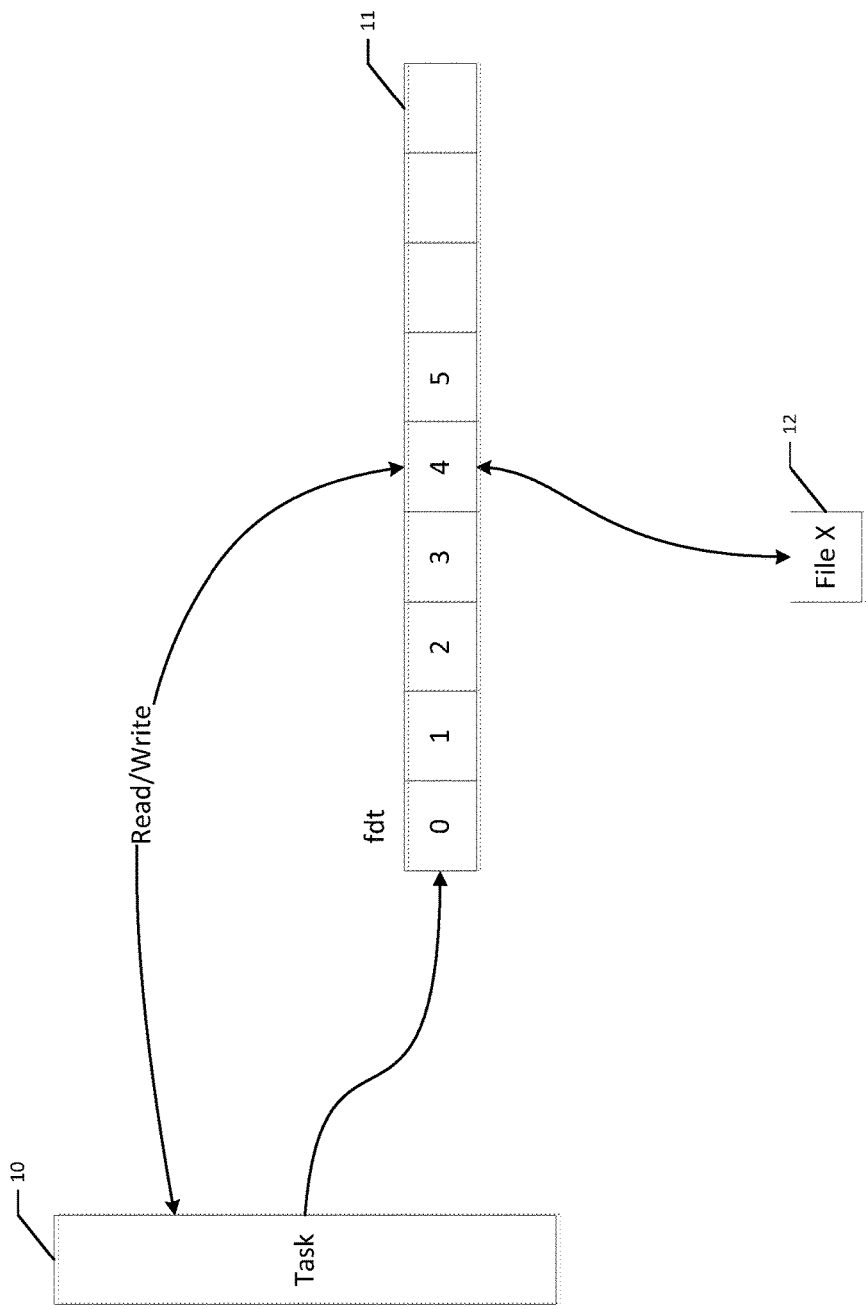
FIG. 1 illustrates a high-level flow diagram for execution and working with files of a conventional computer process.

Various aspects are now described with reference to the drawings, wherein like reference numerals are used to refer to like elements throughout. In the following description, for purposes of explanation, numerous specific details are set forth in order to promote a thorough understanding of one or more aspects. It may be evident in some or all instances, however, that any aspect described below can be practiced without adopting the specific design details described below. In other instances, well-known structures and devices are shown in block diagram form in order to facilitate description of one or more aspects. The following presents a simplified summary of one or more aspects in order to provide a basic understanding of the aspects. This summary is not an extensive overview of all contemplated aspects, and is not intended to identify key or critical elements of all aspects nor delineate the scope of any or all aspects.

Figure 2:
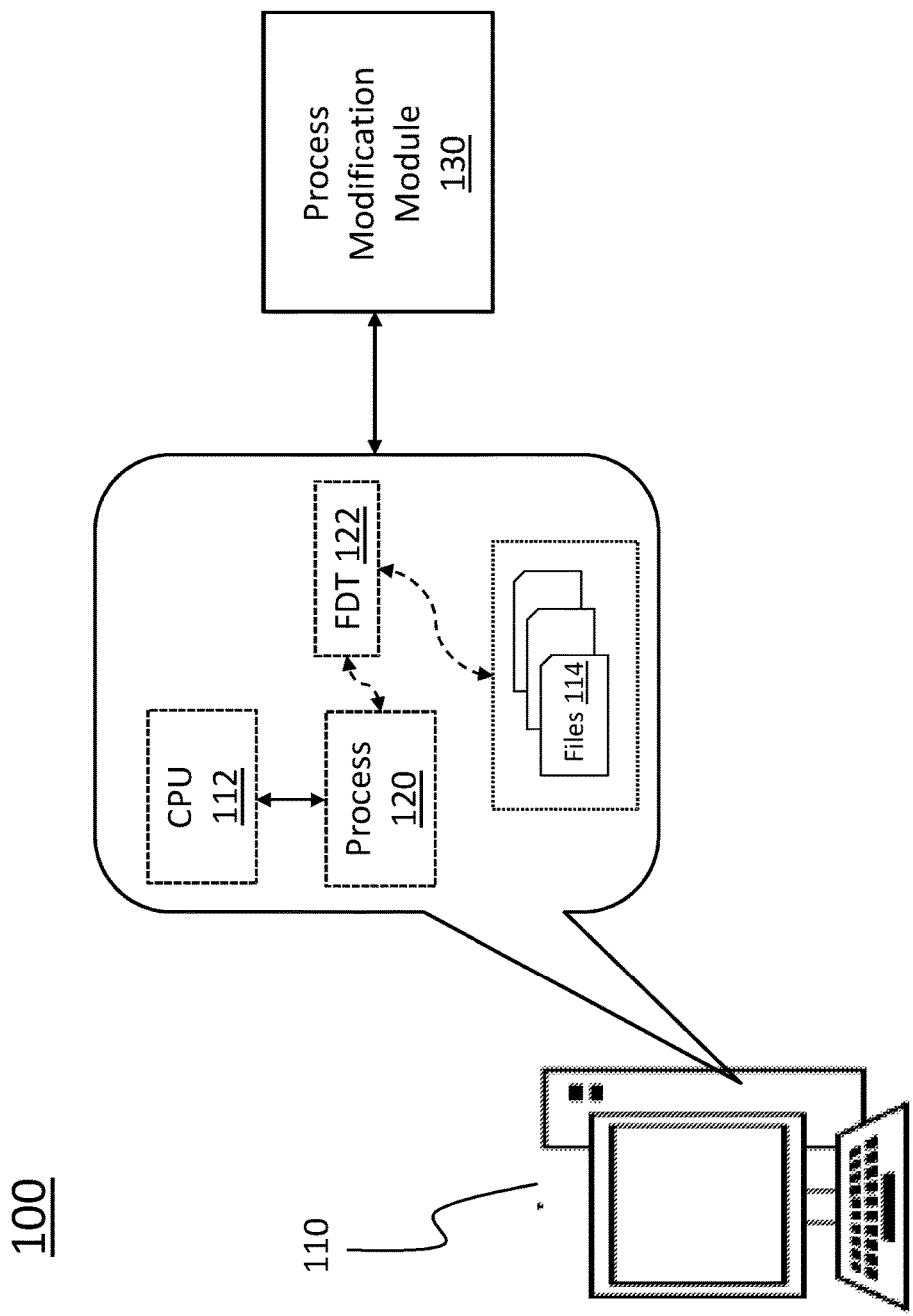
FIG. 2 illustrates a high-level block diagram of a system for intercepting and controlling data traffic between a computer process and a file according to an exemplary aspect.

FIG. 2 illustrates a high-level block diagram of a system for intercepting and controlling data traffic between a computer process and a file or other system resource according to an exemplary aspect. As shown, system 100 includes a computing device 110 (e.g., a client device) that executes many processes during operation as should generally be understood to one skilled in the art. More particularly, the computing device 110 includes a central processing unit ("CPU") 112 that is configured to execute one or more processes 120. In general, a process can broadly be considered an instance of a computer program that is being executed within an operating system. Thus, a computer program is a passive collection of instructions, while the process is the actual execution of the computer program instructions inside a special environment created for it by an operating system by the CPU 112. Each process 120 therefore contains the program code and its current activity.

Although not shown in detail, the computer device 110 includes electronic memory that stores the executable code that is executed by the CPU 112, process-specific data (input and output), a call stack that tracks active subroutines, etc., and a heap to hold intermediate computation data generated during run time. Moreover, the computer device 110 includes an operating system that includes descriptors of resources (e.g., files 114) that are allocated to each process 120. For example, the operating system of the computer device 110 (i.e., the operating system kernel) includes one or more file descriptor tables ("FDTs") 122 that provide a reference or indicator to each process 120 during execution to access a file 114 or other input/output resources, such as a pipe or network socket. In one aspect, each file descriptor table forms part of the POSIX ("the Portable Operating System Interface") application programming interface for the computer device 110. Moreover, it should be appreciated that each file descriptor in each table is a non-negative integer, generally represented in the C programming language as the type "int". The details of the file descriptor table 122 will be described in more detail below.

It should be appreciated that the exemplary aspect is described as operating in a computing environment using a LINUX operating system, for example. In an alternative aspect, the system and method can be implemented on a WINDOWS operating system. In this case, index references for system resources are called "file handles" (instead of file descriptors), and the table including index references for system resources (i.e., similar to file descriptor tables 122 and 136 described herein) is called "file handle table" (instead of file descriptor table). Otherwise, the method and algorithm of functioning of the system as described herein is the same for either a LINUX or WINDOWS operating system. Moreover, a communication channel can be either a pipe or a socket. Preferably, pipes are used when task 120 and proxy task 132 are running on the same machine (physical or virtual), and sockets are preferably used when these two tasks are running on the different machines. It should be appreciated that for purposes of this disclosure, the terms "file descriptor" and "file handle" can be used interchangeable and likewise the terms "file descriptor table" and "file handle table" can be used interchangeably.

During operation, the CPU 112 executes process 120, which in turn uses file descriptor table 122 to access one or more system resources, such as files 114. According to the exemplary aspect, process modification module 130 is configured to access and modify process 120 to perform some type of desired data processing action (e.g., encryption and decryption) of data written to and read from files 114. Although the details of process modification module 130 will be described below, process modification module 130 includes a plurality of sub-modules configured to perform the algorithms disclosed herein. Each of these sub-modules can be considered a single module or separate software modules, with the modules each including software code (e.g., processor executable instructions) in the memory of the computer device 110, which may be configured to execute/facilitate the control and modifying of process 120 according to an exemplary embodiment. Moreover, process modification module 130 is shown as a separate component from computer device 110 in the exemplary and can be executed on a separate computing device (e.g., a system server) that is communicatively coupled to computer device 110 over a network (e.g., as part of the Internet or intranet using various communications infrastructure such as Ethernet, WiFi and the like), for example. In another aspect, process modification module 130 can be a software module that is installed on computer device 110 and executed by CPU 112.

Moreover, as used herein, the term "module" can refer to a software service or application executed on one or more computers, including real-world devices, components, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module can also be implemented as a combination of the two, with certain functions facilitated by hardware alone, and other functions facilitated by a combination of hardware and software. In certain implementations, at least a portion, and in some cases, all, of a module can be executed on the processor of a general purpose computer. Accordingly, each module can be realized in a variety of suitable configurations, and should not be limited to any example implementation described herein.

Figure 3:
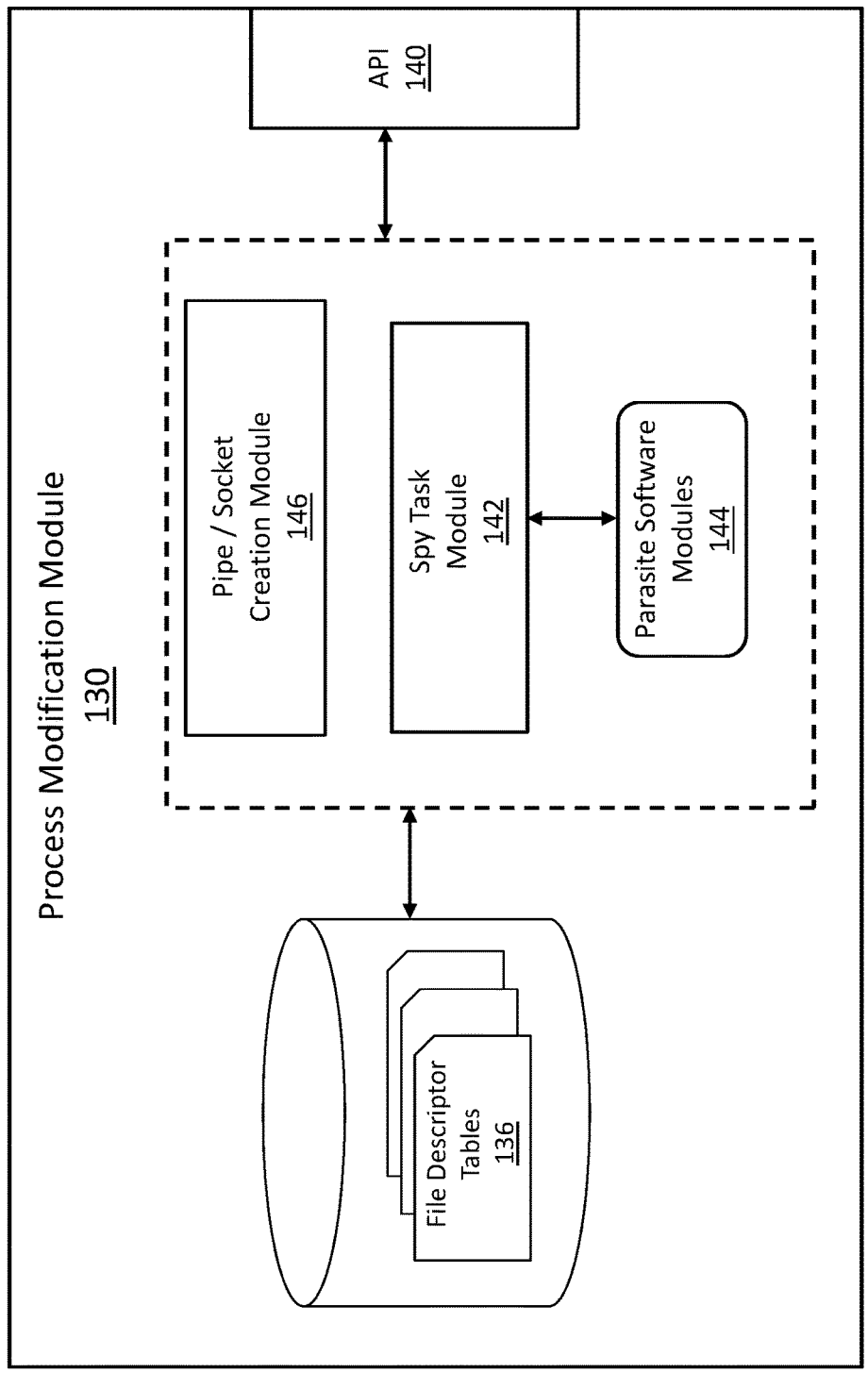
FIG. 3 illustrates a detailed block diagram of the process modification module 130 illustrated in FIG. 2 according to an exemplary aspect.

FIG. 3 illustrates a detailed block diagram of the process modification module 130 illustrated in FIG. 2 according to an exemplary aspect. As shown, process modification module 130 uses an application programming interface ("API") 140, which is a debugging interface configured to access process 120 provided by the operating system executed by computer device 110. Moreover, a spy task module 142 is provided to generate and/or provide parasite software modules 144 that can be loaded in the address space of the target process 120 via API 140. In general, the parasite software module 144 is loaded in process 120 and is used to interact with process 120 to get the process 120 to perform desired operations relating to access of files 114. In the exemplary aspect, the parasite software modules 144 can be considered a security exploit in that spy task module 142 implementing the parasite software modules 144 has no authority to consume resources (e.g., files 114) that are otherwise available to the process 120.

As will be described in detail below, once the parasite software module 144 is loaded to the address space of the process 120, the process modification module 130 is able to create and/or modify the routing of operations between process 120, file descriptor table 122 and files 114. In this regard, the process modification module 130 further includes a pipe/socket creation module 146 that is configured to generate and provide a pipe and/or socket (generally referred to as a communication channel) between file descriptor table 122 of the victim task on the computer device 110 and the file descriptor table 136 of the process modification module 130. The file descriptor table 136 functions in the same manner as file descriptor table 122 (described above) by providing an index between processes and resources (i.e., an index of file descriptor of the resource in the process file descriptor table).

It should be appreciated that while the exemplary aspect mainly describes managing data traffic between a process and a file, the system and method described herein can be implemented for managing data flow between a process and other types of system resources. Thus, in one aspect, not only file inputs/outputs can be intercepted and processed, but the system and method can also intercept and process inputs/outputs to other system resources, such as memory mappings, for example. In this case, the proxy/spy task can implement techniques to monitor the data used by the original task in an effective and invisible to the latter task manner.

Thus, according to the exemplary aspect, the pipe/socket creation module 146 is configured to create a socket (i.e., an inter-process communication (IPC) socket), e.g. a UNIX domain socket, that is a data communication endpoint for exchanging data between processes (e.g., process 120) and a spy task executing on the same host operating system (e.g., computer device 110). Furthermore, the pipe/socket creation module 146 is configured to generate a pipe or socket or any other communication channel, which can be used by parasite module and the spy task (process modification module). Generally, pipes are unidirectional for communication, but may have a return channel or backchannel. According to the exemplary aspect, the pipes can be implemented in memory of the single computer device 110 where both processes (i.e., process 120 and spy task) are executed. Moreover, sockets are much more flexible because they provide communication between processes on different hosts. For example, a socket will be used if the spy task is executed on a different host device than the process 120 according to one exemplary aspect.

Figure 4A:
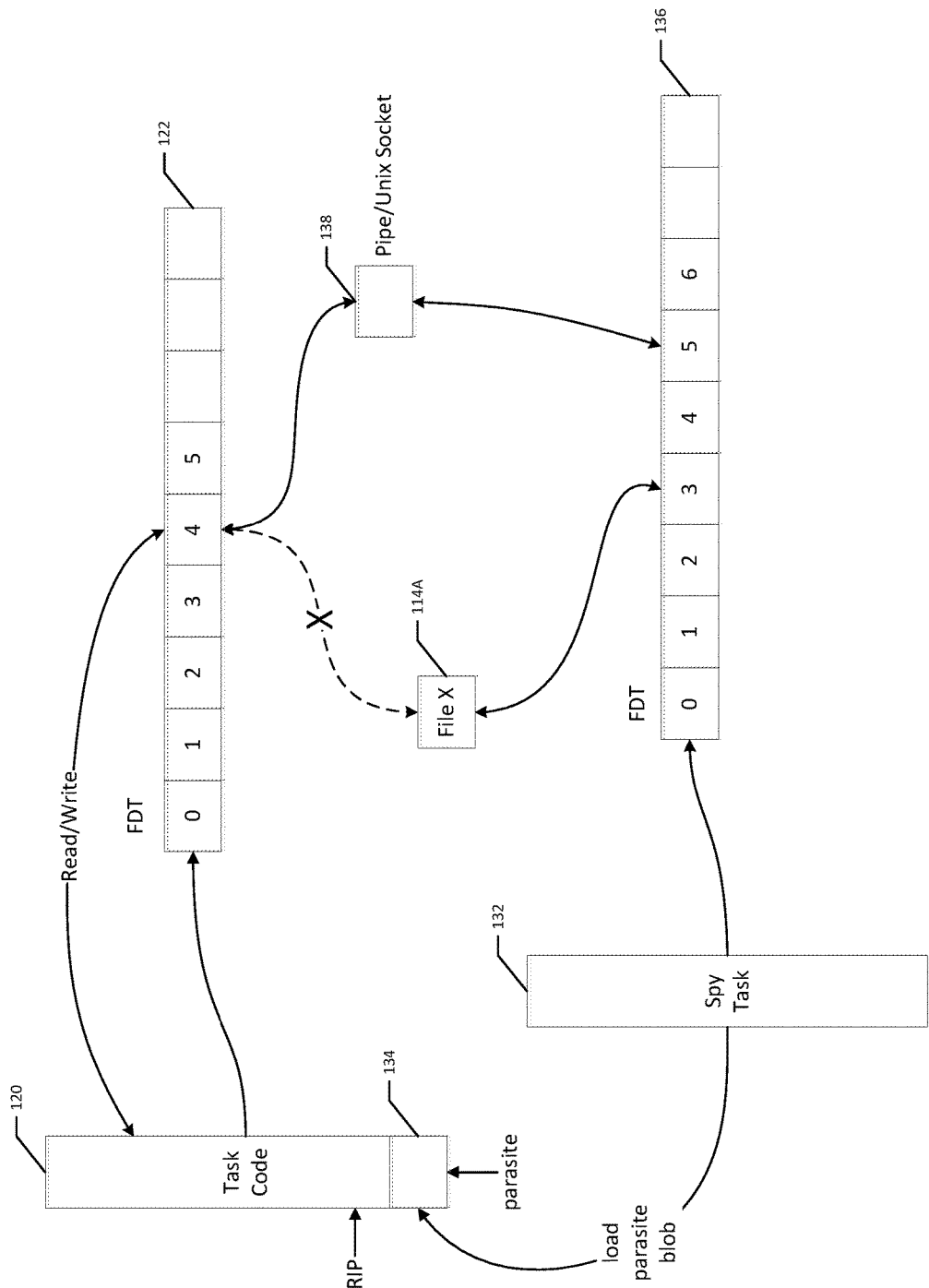
FIG. 4A illustrates a high-level flow diagram for a method for intercepting and controlling data traffic between a computer process and a file according to an exemplary aspect.

FIG. 4A illustrates a high-level flow diagram for a method for intercepting and controlling data traffic between a computer process and a file or other system resource according to an exemplary aspect. As shown, a task code 120 (corresponding to process 120 described above) is configured to perform a number of operations that include the accessing the system resources (e.g., read and write to "File X" 114A) using file descriptor table 122. It should be appreciated that "File X", as the term is used herein, is not only limited to a conventional computer file as a resource for storing information. Rather, in LINUX terminology for example, File X can be considered an abstract file, that be, for example, a disk file, a pipe, a device, a socket, a terminal or the like.

Moreover, according to the exemplary aspect, the file descriptor table 122 provides an index in a table so that each file (or other resource) can be accessed by task code 120 using this index. FIG. 4D illustrates a functional diagram of an exemplary file descriptor table 122 according to another exemplary aspect. As shown, each index number in the file descriptor table 122 indicates a corresponding system resource (e.g., a file, but can also be a pipe, socket, etc.) for which the task code 120 can access during execution. In this example, index number "0" corresponds to a "File A", index number "1" corresponds to a "File B", and index number "2" corresponds to a "File C". Thus, when task code 120 accesses one of these index numbers in the file descriptor table 122 (in response to a write operation, for example), the task code 120 in turn is directed to the location and access of the corresponding file (or other system resource) by calling a special system call for the corresponding file descriptor.

In any event, referring back to FIG. 4A, as shown, the process modification module 130 is configured to eliminate direct reference from file descriptor table 122 to File X (referenced by index number 4 in file descriptor table 122) and instead reroute this communication path through a pipe or socket 138 (e.g., UNIX socket) that connects file descriptor table 136 corresponding to the process modification module 130.

In particular, while process 120 is initially executing its normal code, the process modification module 130 is configured to interrupt this process using debugging API 140 and load its own code (i.e., parasite software module 144) into the address space of task 120. For example, the spy task 132, which uses spy task module 142, interrupts the process and loads a parasite blob (i.e., a parasite software module 144 that can be a binary blob) to the first process (i.e., task code 120) using a utility (e.g., the COMPEL library) described above, for example, and passes control to the parasite blob by placing an instruction pointer (i.e., an RIP) from next instruction in first process 120 to the entry point of the parasite blob (i.e., a parasite software module 144).

During execution, the parasite software module 144 then connects to spy task 132 with UNIX socket 138 and sends the File X 114A to the spy task 132 via the socket 138. Specifically, the parasite software module 144 is configured to receive the File X 114A from the parasite code 134 and provide access to the File X 114A via file descriptor table 136. As further shown, the file descriptor for File X 114A then appears in the spy task file descriptor table 136, at index 3, for example.

Once the file descriptor for File X 114A is added to file descriptor table 136, the pipe/socket creation module 146 is further configured to create a data communication channel between the two processes, i.e., task 120 and spy task 132. As shown, in the exemplary aspect, the pipe/socket creation module 146 creates a pipe or UNIX socket 138 and writes its descriptor to the file descriptor table 122 of the task 120, and, specifically, to the index (e.g., index number 4) that previously contained the file descriptor for File X 114A (i.e., index number 4). As a result, index number 4 of the file descriptor table 122 now references pipe or UNIX socket 138, which in turn is a communication channel to spy task 132 (so that the file descriptor of the communication channel appears in the file descriptor channel 136 of spy task). The communication channel can be a pipe or a socket, so in LINUX, the communication channel is a type of file and has file descriptor. As further shown, the spy task module 142 is configured to update file descriptor table 136 to include a descriptor to File X 114A. This is shown as index number 3 of file descriptor table 136. As a result, at this point, the direct reference between file descriptor table 122 and File X 114A has been removed as indicated by the "X" through this arrowed connection. After the reference to File X 114A by task code 120 has been rerouted through spy task 132, the parasite software module 144 exits (i.e., stops) and is unloaded (i.e., deleted or removed) from task code 120.

According to one exemplary aspect, the parasite software module 144 is written in C since some libraries (such as COMPEL) support only C. In this aspect, the parasite software module 144 is first compiled and then COMPEL makes linking with a specific additional code that turns the compiled program into a parasite blob. As noted above the parasite blob can then be loaded in the address space of task code 120, given control and signaled its stop point.

Figure 4B:
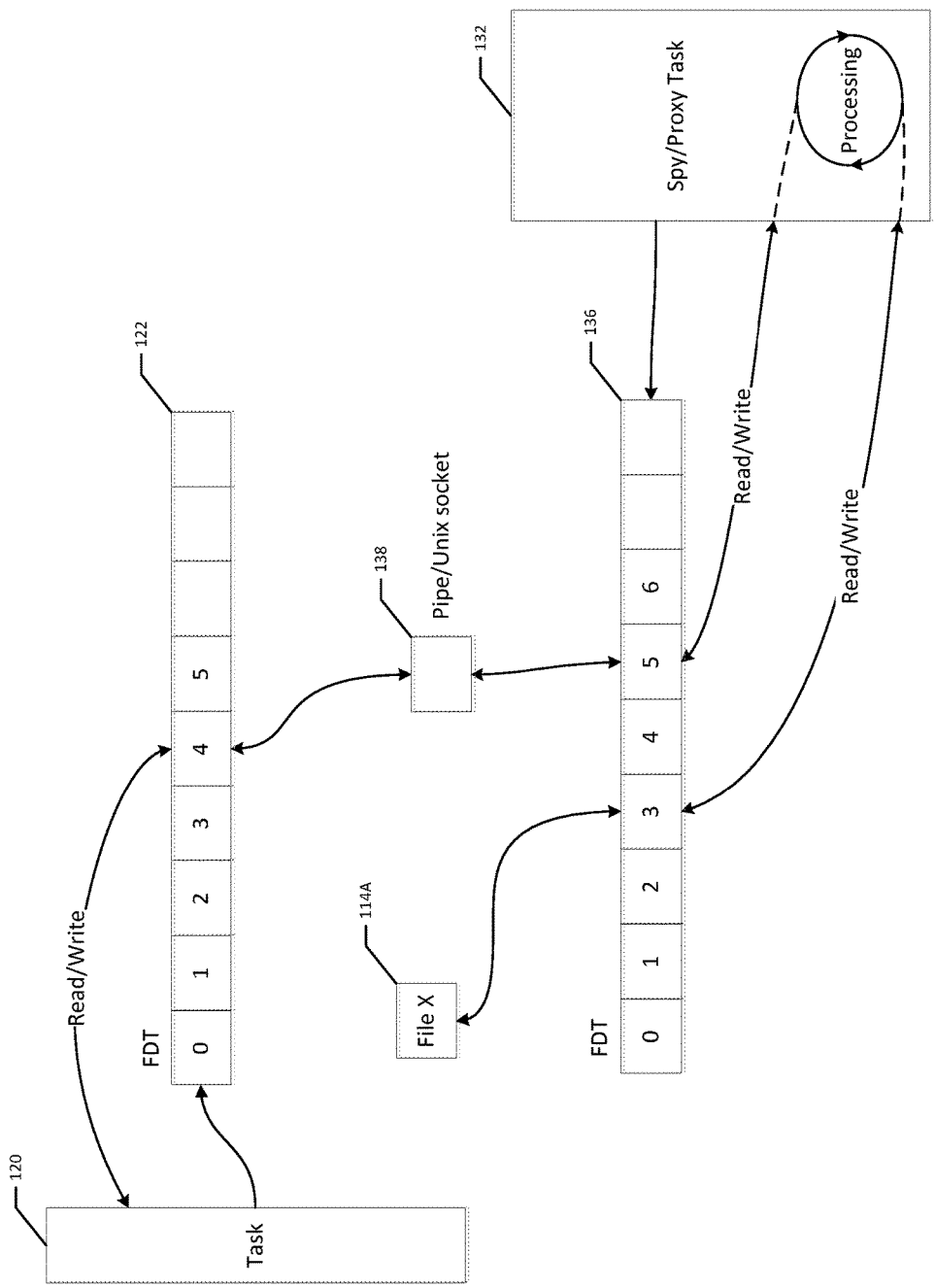
FIG. 4B illustrates a high-level flow diagram of the process flow after modifying the computer process as shown in FIG. 4A.

FIG. 4B illustrates a high-level flow diagram of the process flow after modifying the computer processes as shown in FIG. 4A. As shown, during execution of task 120 by CPU 112, the task 120 references file descriptor table 122 to access each system resource (e.g., read or write operations) during execution. As shown, when a specific operation (e.g., read or write operation) of task 120 references descriptor number 4 of file descriptor table 122 (which previous referenced File X 114A directly), the descriptor number 4 now references a communication channel, i.e., pipe or socket 138 (e.g., UNIX socket). The communication channel 138 is referenced by spy task, and, specifically, descriptor number 5 of file descriptor table 136. In other words, the communication channel 138 is between process 120 and spy task 132. This reference is to spy/proxy task 132, which is configured to process the incoming/outgoing data traffic to and from File X. As generally shown, these operations can be read and/or write operations and spy/proxy task 132 can perform an operation on such data. For example, in one aspect spy/proxy task 132 is configured to perform a data encryption and decryption of data being written to and read from File X 114A. As further shown, the File X 114A is referenced in file descriptor table 136 at reference number 3, for example. It should be appreciated that after the algorithm is performed as described above with respect to FIG. 4A, the spy/proxy task 132 is able to control all data generated by the first task 120 and transmitted and from to the File X 114A. Therefore, the spy/proxy task 132 can analyze, change and perform any actions to the data, such as encryption and decryption, for example.

Figure 4C:
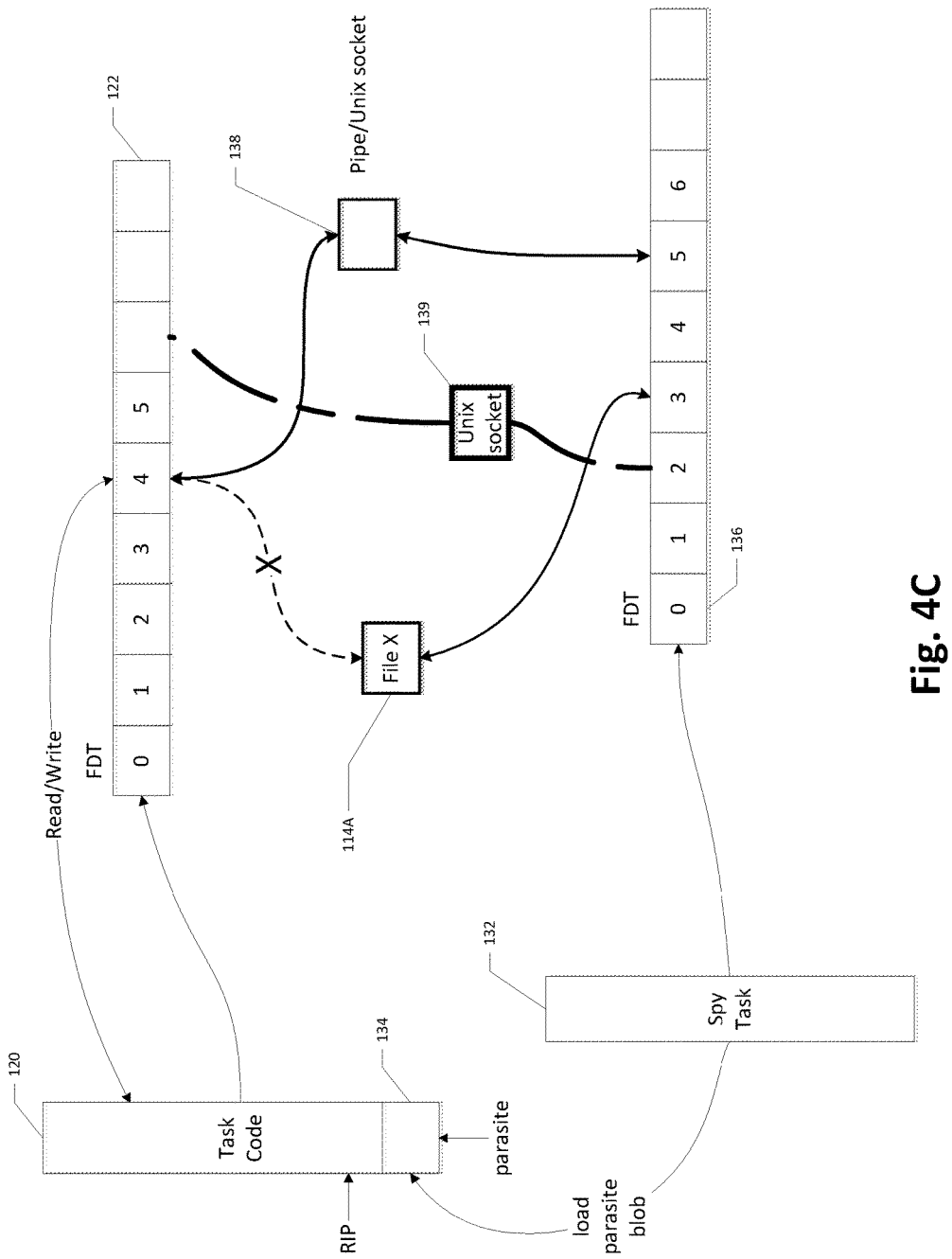
FIG. 4C illustrates a high-level flow diagram for a method for intercepting and controlling data traffic between a computer process and a file according to another exemplary aspect.
Figure 4D:
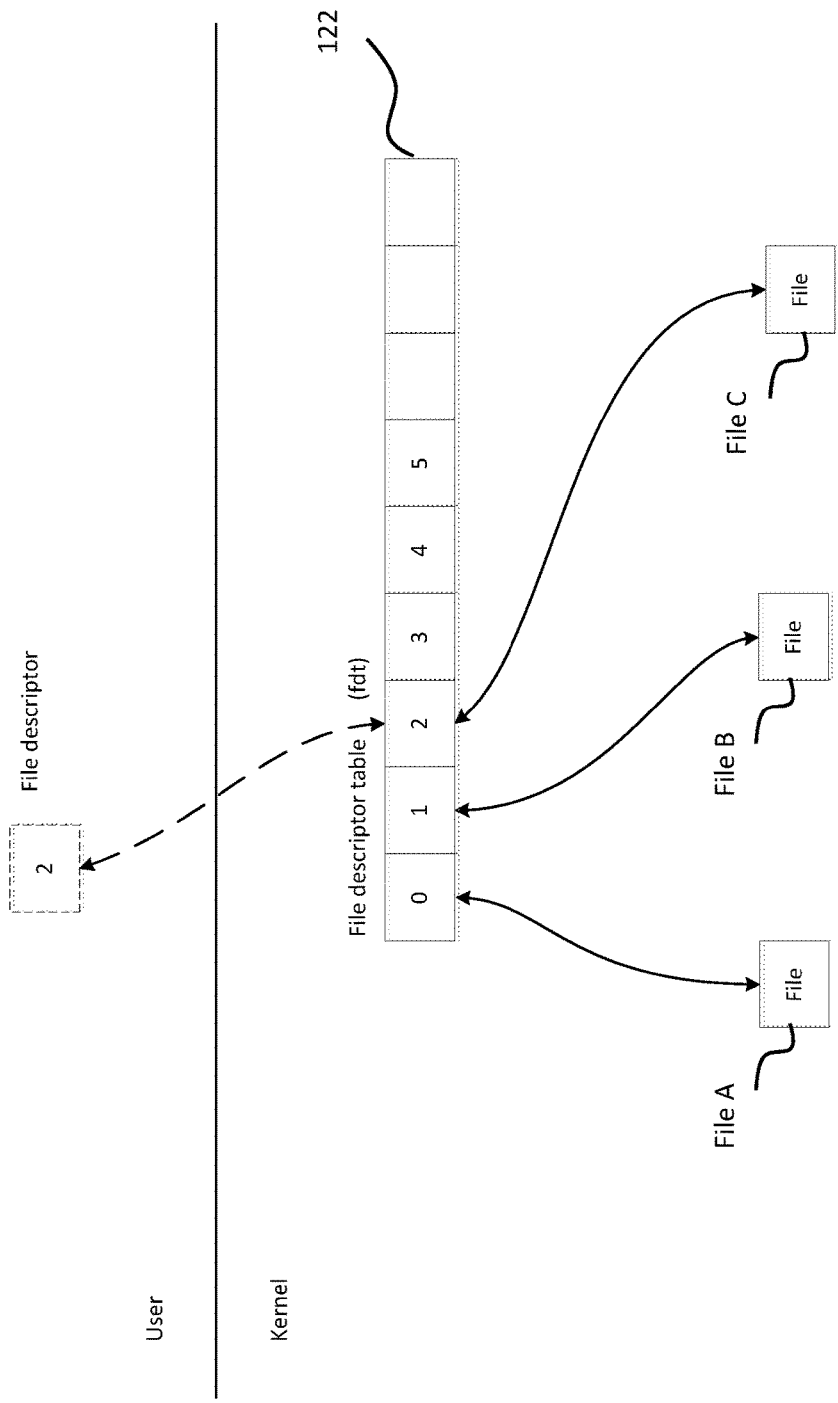
FIG. 4D illustrates a functional diagram of an exemplary file descriptor table according to another exemplary aspect.

FIG. 4C illustrates a high-level flow diagram for a method for intercepting and controlling data traffic between a computer process and a file or other system resource according to another exemplary aspect. As shown, most of the components provided herein are the same components implemented in the method described above with respect to FIG. 4A. The details and function of such components will not be repeated herein. The main refinement shown is that when the parasite blob takes control of task code 120, a socket 139 (e.g., a UNIX socket) is set up between task 120 and spy/proxy task 132 to transfer access of File X 114A from task code 120 to spy task 132. The descriptors of this socket appear in file descriptor table 122 and file descriptor table 136. Next, a pipe 138 may be established between descriptor table 122 and file descriptor table 136 as described above. Once the indices of both descriptor table 122 and file descriptor table 136 are updated, the UNIX socket 139 is destroyed and removed from the data flow of the resulting system and processes. In this instance, the same data flow shown in FIG. 4B will result from this method. In an alternative aspect, if a socket is required for communication between descriptor table 122 and file descriptor table 136 (i.e., between process 120 and spy task 132), for example, if these two tasks are in separate operating systems (and so these tables are parts of separate operating systems) of separate systems, then UNIX socket 139 will not be destroyed. Rather, this UNIX socket 139 will replace the functionality of the pipe 138 described above. Advantageously, this step minimizes processing steps to optimize the algorithm and reduce consumption of computing resources, including processing resources and memory.

In either event, referring back to the flow diagram shown in FIG. 4B, it should be appreciated that spy/proxy task 132 is a software process that now controls and manages the operations of the data traffic to and from File X 114A. As described above, execution of the task 120 by CPU 112 includes referring to file descriptor table 122, which in turn indirectly accesses File X 114A. The exemplary system and method utilizes the process modification module 130 to change the common scheme into another new scheme with spy/proxy task 132 (which is a new software process or module) with its own file descriptor table 136 to control access to File X 114A. Therefore, in a write operation performed by task 120, for example, data that previously would be transmitted directly into a File X 114A, now goes into the pipe or socket 138 and then into the spy/proxy task 132, which executes the operation, e.g., being read and processed (e.g., traffic analyzing, packing/unpacking, encrypting/decrypting, multiplexing) by the process 132 before finally be input to File X 114A. In other words, data will be written to File X 114A, but only after it is processed by spy/proxy task 132 (i.e., an interagent).

According to this exemplary aspect, a read operation works according to a similar algorithm. For example, when task 120 requests a read operation from File X 114A, the spy task 132 will execute a system call for the descriptor (e.g., descriptor number 3 in file descriptor table 136) corresponding to the File X 14A. Then, the spy task 132 will pass data to the task 120 using pipe or UNIX socket 138. In turn, the task 120 will read the data from the pipe/UNIX socket 138.

According to the exemplary aspect, the process modification module 130 is configured to replace the opened file of the process (i.e., the indicator between file descriptor table 122 and File X 114A) with pipe or UNIX socket 138. In LINUX it is possible to transmit opened files between processes using UNIX domain socket. Moreover, the File X 114A is transferred to the caller process, which is the spy/proxy task 132. Furthermore, it should be appreciated that while spy and proxy tasks are shown as a single component in the exemplary aspect, these two functions can be separate software modules in an alternative aspect.

The exemplary system and method can use the tunneling technique to modify various files and employ multiple types of processing on the data traffic. For example, in one aspect, the first process (i.e., task 120) may have a socket as File X. In this aspect, the socket may be considered a file, so it is possible to implement the scheme described above. Using a library, such as COMPEL, the system is configured to load the binary file (i.e., the parasite blob) to the first process 120. The parasite blob then replaces the original socket with a new socket (e.g., pipe/socket 138), which belongs to the second process (i.e., spy task 132). As a result, the spy task 132 can intercept the data traffic that the first process 120 transmits through sockets, and perform a desired processing on the data traffic (e.g., analyze, pack, and the like).

Although in no way limited, the spy/proxy task 132 is configured to perform different types of processing on the data traffic written to and read from File X 114A. For example, in one aspect, the proxy task 132 is configured to inject a socket spy that is configured to analyze the data traffic. In this exemplary aspect, the second process is configured to reads all the data traffic generated by the first process 120, analyze it and identify key words. After any key word is identified, the second process 132 is configured to perform some actions corresponding to the key word. In one aspect, the key words can be user defined for the interception process. For example, the spy/proxy task 132 lists all sockets a process uses and asks the intercepting code to identify the proxy/tunnel that would allow spy task to analyze the data traffic to identify all data including the key words from a predefined list. Thus, if the first process 120 is an http server, for example, and the data flow is http traffic, then keywords may be those matching particular http header parameters or tags or the like, for example. In this regard, the processing by spy task 132 can be to fix URLs on a given pages, redirect a user to another page, fix bad encodings, and the like.

In a related aspect, the second process 132 is configured to pack and unpack data traffic. In this aspect, the second process 132 is configured pack the data traffic generated by the first process and unpack received data traffic. For example, there can be considered two processes that communicate data using sockets. Moreover, the processes can be located on different computers and connected via the Internet. Moreover, the processes may be configured to send and receive huge amounts of data. In this exemplary aspect, the spy proxy process 132 is configured to pack and unpack the data as it is transmitted to and from the processes to facilitate the transmission of this large amount of data. Moreover, it should be appreciated that there will be an analogous proxy process on the second computer.

In another aspect, the spy/proxy process 132 is configured to encrypt and decrypt data that is transmitted to and written from File X 114A. Specifically, the spy process 132 is configured to encrypt the data traffic generated by the first process 120 and decrypt received data traffic, using known data encryption techniques (e.g., RSA public-key encryption, AES, and the like). For example, the aspect can prove useful for two processes that are connected by unsecure channel. In such cases, it is reasonable to put two decrypting processes between them that encrypt data before sending it to the channel and decrypt received data. Using the disclosed system and method, it is possible to implement encryption to an unsecure channel without restarting or recompiling the connected processes (e.g. process 120).

In yet another aspect, the second process 132 can be configured to facilitate traffic fanout (i.e., multiplex) of the data traffic. For example, in an exemplary aspect, the first process 120 uses sockets for network communication. Using the above described algorithm, the second process 132 can take away all the sockets of the first process 120 and then analyze the data traffic transmitted to and received from the first process 120. Moreover, the second process 132 can then send some of the data traffic (e.g., the messages) to a third process that can handle messages instead of the first process 120 (assuming it is allowed to by the protocol). As a result, the disclosed system and method is configured to remove the exclusive usage of the network channel from the first process 120 and to add at least one other process (i.e., the third process) that can handle such messages.

Figure 5B:
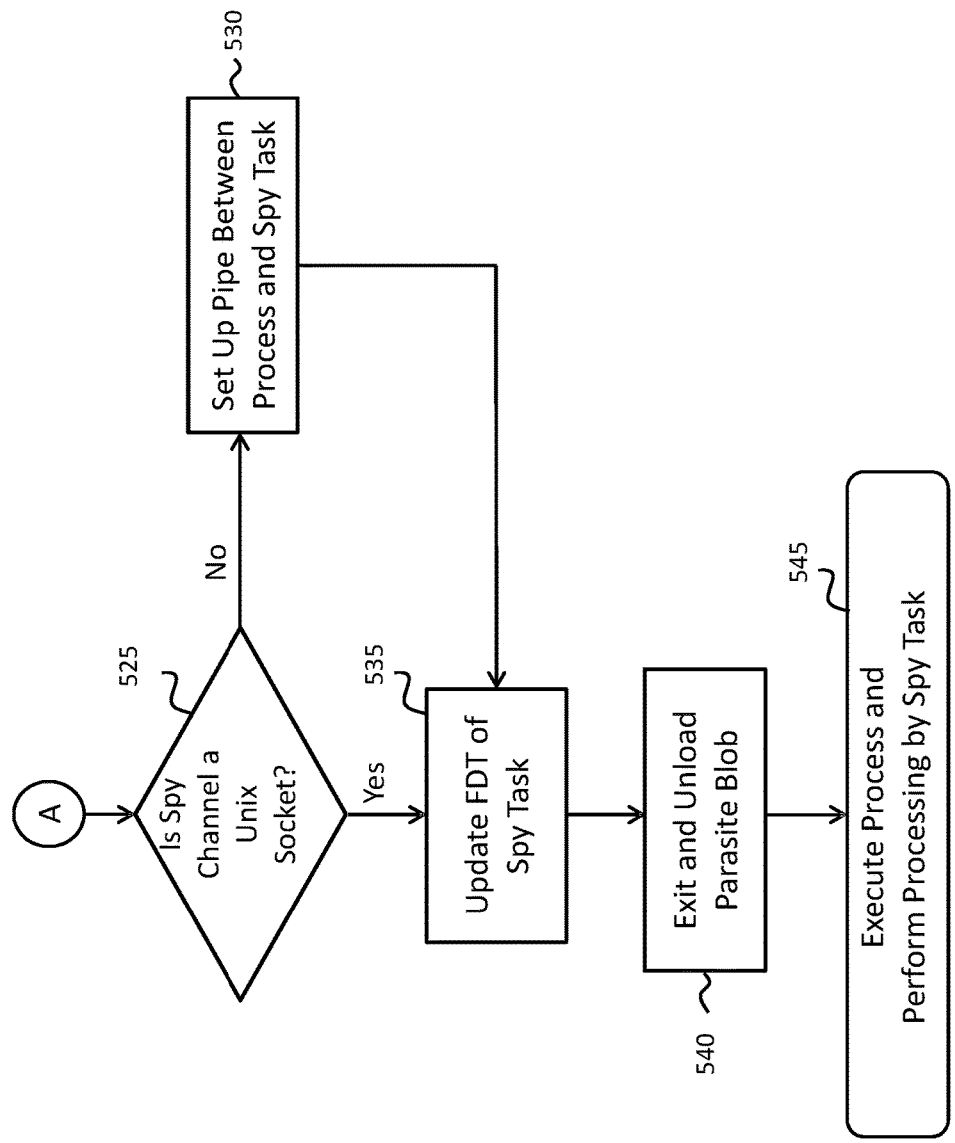

FIGS. 5A-5B illustrates a flowchart for a method for intercepting and controlling data traffic between a computer process and a file descriptor according to an exemplary aspect. In general, it should be appreciated that the components described above are provided as examples of the software and hardware components configured to perform the exemplary steps of the method. This description is provided as an exemplary illustration of this aspect. As shown, initially at step 505, the spy task 132 is configured to stop the execution of a process 120 on a computer device 110 using a debugging API 140, for example. The process 120 can be considered a first or primary process or task according to an exemplary aspect. Next, at step 510, the spy task 132 loads a parasite (e.g., parasite software module 144) into the address space of the process 120. The spy task 132 can be considered a second or secondary process or task according to an exemplary aspect.

At step 515, a socket (e.g., a UNIX socket) is then established as a communication channel between the process 120 and the spy task 132 as described above. Next, at step 520, the parasite (e.g., parasite software module 144) takes control of the process 120 and transfers control of a file (e.g., File X) to the spy task 132 (i.e., by sending opened file descriptor). This is done using the UNIX socket set up at step 515, for example.

As further shown in FIG. 5B, the process modification module 130 then determines whether the spy channel that will be used during actual processing will be a UNIX socket or if it needs to be a pipe. For example, in one aspect, the spy task is configured to select either a pipe or a UNIX socket or some other type of communication channel (i.e., file) based on the parameters of the computer system(s) involved in the process. If it is not a UNIX socket, the method proceeds to step 530 where a separate pipe is established between process 120 and spy task 132, for example. Otherwise, if the communication channel is to be a UNIX socket, the method proceeds directly to step 535. In other words, as described above, the system is optimized by using the same UNIX socket set up at step 515 as the communication channel between process 120 and spy task 132 during execution of process 120. In either case, at step 535, the file descriptor table 136 of the process modification module 130 is updated to reflect the reference number in the file descriptor table 136 referring to the File X. Once the file descriptor table 136 is updated and accurate, the parasite blob (e.g., parasite software module 144) stops and gets removed from the address space of the process 120. Finally, at step 545, execution of process 120 is continued (i.e., restored) and all applicable data traffic being written to and read from File X 114A is first processed by spy task 132. As a result, the disclosed method is able to add a level of processing to the data traffic by spy task 132 without restarting or recompiling the process 120 being executed by CPU 112 of computer device 110.

Figure 6:
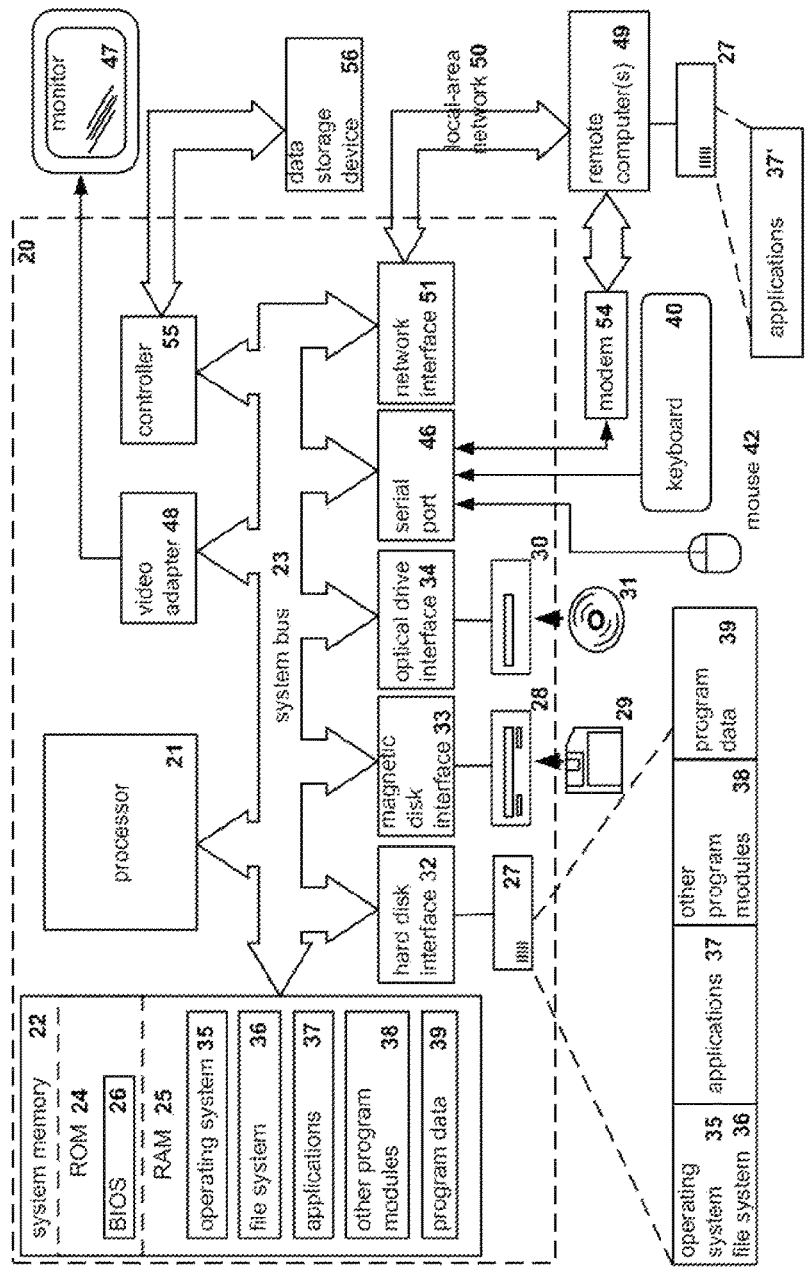
FIG. 6 illustrates an example of a general-purpose computer system (which may be a personal computer or a server) on which the disclosed systems and method can be implemented according to an example aspect.

FIG. 6 illustrates an example of a general-purpose computer system (which may be a personal computer or a server) on which the disclosed systems and method can be implemented according to an example aspect. It should be appreciated that the detailed general-purpose computer system can correspond to computer device 110 and/or a separate computing system or server configured to executed the process modification module 130 and perform the above-described algorithm according to an exemplary aspect.

As shown, the computer system 20 includes a central processing unit 21, a system memory 22 and a system bus 23 connecting the various system components, including the memory associated with the central processing unit 21. For example, the central processing unit 21 can correspond to the CPU 112 and the system memory 22 can correspond to memory of computer device 110 as described above. Furthermore, the system bus 23 is realized like any bus structure known from the prior art, including in turn a bus memory or bus memory controller, a peripheral bus and a local bus, which is able to interact with any other bus architecture. The system memory includes read only memory (ROM) 24 and random-access memory (RAM) 25. The basic input/output system (BIOS) 26 includes the basic procedures ensuring the transfer of information between elements of the personal computer 20, such as those at the time of loading the operating system with the use of the ROM 24.

The personal computer 20, in turn, includes a hard disk 27 for reading and writing of data, a magnetic disk drive 28 for reading and writing on removable magnetic disks 29 and an optical drive 30 for reading and writing on removable optical disks 31, such as CD-ROM, DVD-ROM and other optical information media. The hard disk 27, the magnetic disk drive 28, and the optical drive 30 are connected to the system bus 23 across the hard disk interface 32, the magnetic disk interface 33 and the optical drive interface 34, respectively. The drives and the corresponding computer information media are power-independent modules for storage of computer instructions, data structures, program modules and other data of the personal computer 20.

The present disclosure provides an exemplary implementation of a system that uses a hard disk 27, a removable magnetic disk 29 and a removable optical disk 31, but it should be understood that it is possible to employ other types of computer information media 56 which are able to store data in a form readable by a computer (solid state drives, flash memory cards, digital disks, random-access memory (RAM) and so on), which are connected to the system bus 23 via the controller 55.

The computer 20 has a file system 36, where the recorded operating system 35 is kept, and also additional program applications 37, other program modules 38 and program data 39. The user is able to enter commands and information into the personal computer 20 by using input devices (keyboard 40, mouse 42). Other input devices (not shown) can be used: microphone, joystick, game controller, scanner, and so on. Such input devices usually plug into the computer system 20 through a serial port 46, which in turn is connected to the system bus, but they can be connected in other ways, for example, with the aid of a parallel port, a game port or a universal serial bus (USB). A monitor 47 or other type of display device is also connected to the system bus 23 across an interface, such as a video adapter 48. In addition to the monitor 47, the personal computer can be equipped with other peripheral output devices (not shown), such as loudspeakers, a printer, and so on.

The personal computer 20 is able to operate within a network environment, using a network connection to one or more remote computers 49. The remote computer (or computers) 49 are also personal computers or servers having the majority or all of the aforementioned elements in describing the nature of a personal computer 20. Other devices can also be present in the computer network, such as routers, network stations, peer devices or other network nodes.

Network connections can form a local-area computer network (LAN) 50, such as a wired and/or wireless network, and a wide-area computer network (WAN). Such networks are used in corporate computer networks and internal company networks, and they generally have access to the Internet. In LAN or WAN networks, the personal computer 20 is connected to the local-area network 50 across a network adapter or network interface 51. When networks are used, the personal computer 20 can employ a modem 54 or other modules for providing communications with a wide-area computer network such as the Internet. The modem 54, which is an internal or external device, is connected to the system bus 23 by a serial port 46. It should be noted that the network connections are only examples and need not depict the exact configuration of the network, i.e., in reality there are other ways of establishing a connection of one computer to another by technical communication modules, such as BLUETOOTH.

In various aspects, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a processor of a general purpose computer.

In the interest of clarity, not all of the routine features of the aspects are disclosed herein. It will be appreciated that in the development of any actual implementation of the present disclosure, numerous implementation-specific decisions must be made in order to achieve the developer's specific goals, and that these specific goals will vary for different implementations and different developers. It will be appreciated that such a development effort might be complex and time-consuming, but would nevertheless be a routine undertaking of engineering for those of ordinary skill in the art having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

What is claimed:

1. A method for intercepting and processing input/output, the method comprising:
    interrupting an execution of a first process by a CPU of a computing device having an operating system with a first file descriptor table associated with the first process, the first file descriptor table including an reference for the first process to a system resource;
    loading parasite code into an address space of the first process;
    providing, by the parasite code, a communication channel between the first process and a second process;
    updating a second file descriptor table for the second process so that the second file descriptor table includes a first reference to the system resource and a second reference to the communication channel;
    replacing, by the parasite code, in the first file descriptor table the reference for the first process to the system resource by a reference to the communication channel, thereby causing the input/output to go through the communication channel instead of the system resource; and
    restoring the execution of the first process by the CPU of the computing device after the execution of the parasite code is complete.

2. The method according to claim 1, further comprising transferring, by the parasite code, the system resource to the second process using the communication channel.

3. The method according to claim 2, further comprising:
    providing the communication channel as a socket to transfer the system resource to the second process;
    creating a pipe between the first process and a second process to be used during execution of the first process;
    updating the reference in the first file descriptor table to reference the pipe; and
    removing the socket after creating the pipe and transferring the system resource to the second process.

4. The method according to claim 1, wherein, upon the restoring of the execution of the first process, the method further comprises performing a data processing action, by the second process, on data communicated between the first process and the system resource.

5. The method according to claim 4, wherein the performing of the data processing action comprises at least one of encrypting and decrypting the data, packing and unpacking the data, and multiplexing the data.

6. The method according to claim 1, wherein the system resource is one of a disk file, a pipe, a device, a socket, and a terminal device.

7. The method according to claim 4, wherein the performing of the data processing action comprises identifying at least one keyword associated with at least a portion of the data communicated between the first process and the system resource, and performing the data processing action on the portion of the data associated with the at least one keyword.

8. The method according to claim 1, wherein the interrupting of the execution of the first process comprises interrupting the execution of the first process using a Compel library.

9. A system for intercepting and processing input/output, the system comprising:
    electronic memory; and
    a processor configured to:

interrupt an execution of a first process by a CPU of a computing device having an operating system with a first file descriptor table associated with the first process, the first file descriptor table including an reference for the first process to a system resource,
load parasite code into an address space of the first process;
providing, by the parasite code, a communication channel between the first process and a second process,
access from the electronic memory and update a second file descriptor table for the second process so that the second file descriptor table includes a first reference to the system resource and a second reference to the communication channel,
replace, by the parasite code, in the first file descriptor table the reference for the first process to the system resource by a reference to the communication channel, thereby causing the input/output to go through the communication channel instead of the system resource, and
cause the restoring of the execution of the first process by the CPU of the computing device after the execution of the parasite code is complete.

10. The system according to claim 9, wherein the parasite code, when executed by the first process, causes the system resource to be transferred to the second process using the communication channel.

11. The system according to claim 10, wherein the processor is further configured to:
provide the communication channel as a socket to transfer the system resource to the second process;
create a pipe between the first process and a second process to be used during execution of the first process;
update the reference in the first file descriptor table to reference the pipe; and
remove the socket after creating the pipe and transferring the system resource to the second process.

12. The system according to claim 9, wherein, upon the restarting of the execution of the first process, the processor is further configured to cause the second process to perform a data processing action on data communicated between the first process and the system resource.

13. The system according to claim 12, wherein the data processing action comprises at least one of encrypting and decrypting the data, packing and unpacking the data, and multiplexing the data.

14. The system according to claim 9, wherein the system resource is one of a disk file, a pipe, a device, a socket, and a terminal device.

15. The system according to claim 12, wherein the processor is further configured to cause the second process to identify at least one keyword associated with at least a portion of the data communicated between the first process and the system resource, and perform the data processing action on the portion of the data associated with the at least one keyword.

16. The system according to claim 9, wherein the processor is further configured to interrupt the execution of the first process by interrupting the execution of the first process using a Compel library.

17. A non-transitory computer readable medium comprising computer executable instructions for intercepting and processing input/output, including instructions for:
interrupting an execution of a first process by a CPU of a computing device having an operating system with a first file descriptor table associated with the first process, the first file descriptor table including an reference for the first process to a system resource;
loading parasite code into an address space of the first process;
providing, by the parasite code, a communication channel between the first process and a second process;
updating a second file descriptor table for the second process so that the second file descriptor table includes a first reference to the system resource and a second reference to the communication channel; and
replacing, by the parasite code, in the first file descriptor table the reference for the first process to the system resource by a reference to the communication channel, thereby causing the input/output to go through the communication channel instead of the system resource; and
restoring the execution of the first process by the CPU of the computing device after the execution of the parasite code is complete.

18. The non-transitory computer readable medium of claim 17, further including instructions for transferring, by the parasite code, the system resource to the second process using the communication channel.

19. The non-transitory computer readable medium of claim 17, further including instructions for:
providing the communication channel as a socket to transfer the system resource to the second process;
creating a pipe between the first process and a second process to be used during execution of the first process;
updating the reference in the first file descriptor table to reference the pipe; and
removing the socket after creating the pipe and transferring the system resource to the second process.

20. The non-transitory computer readable medium of claim 17, wherein, upon the restarting of the execution of the first process, instructions are further provided for performing a data processing action, by the second process, on data communicated between the first process and the system resource.

21. The non-transitory computer readable medium of claim 20, wherein the instructions for performing the data processing action further comprises instructions for at least one of encrypting and decrypting the data, packing and unpacking the data, and multiplexing the data.

22. The non-transitory computer readable medium of claim 20, wherein the instructions for performing the data processing action further comprises instructions for:
identifying at least one keyword associated with at least a portion of the data communicated between the first process and the system resource, and
performing the data processing action on the portion of the data associated with the at least one keyword.

* * * * *